Patented Sept. 2, 1924.

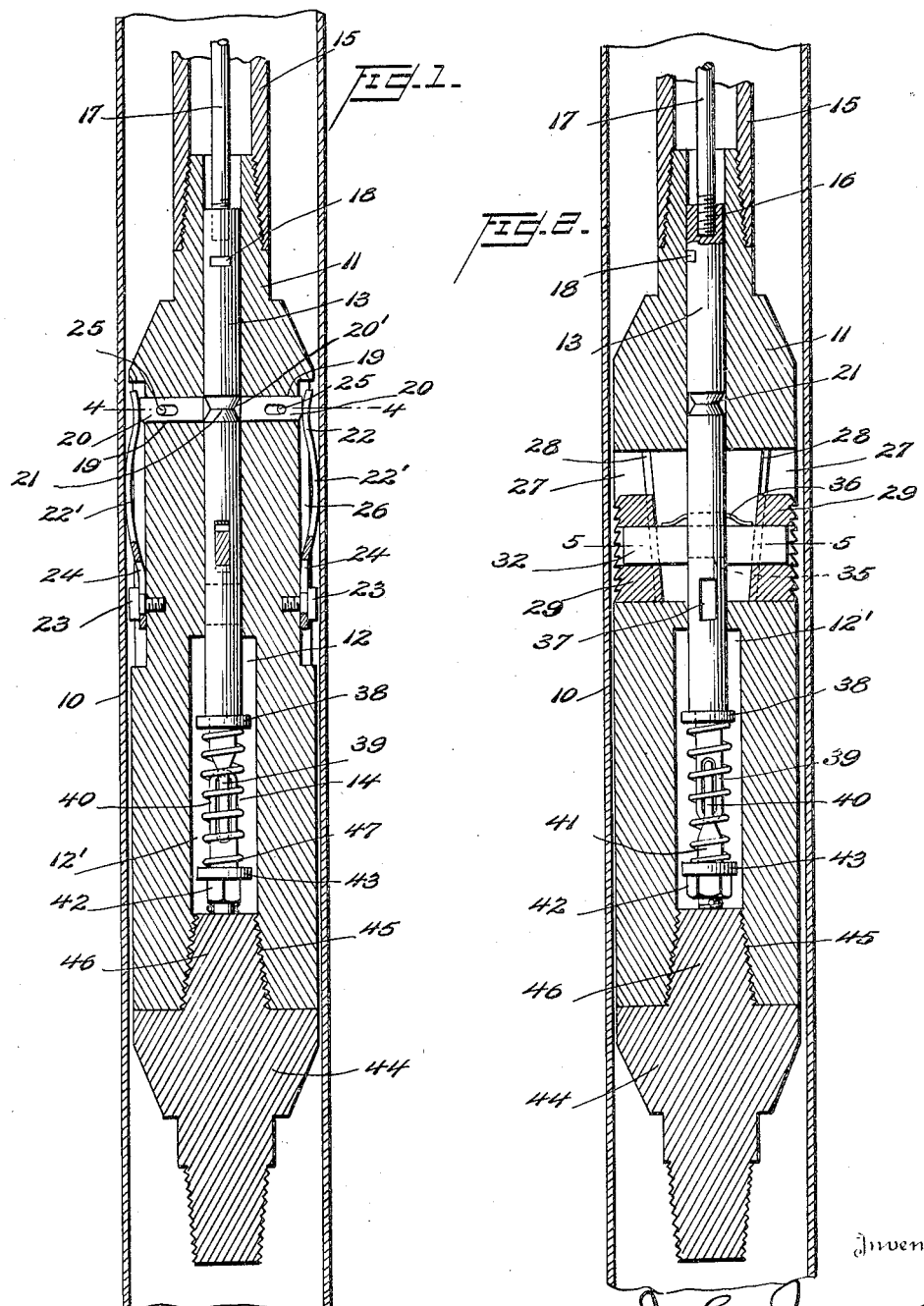

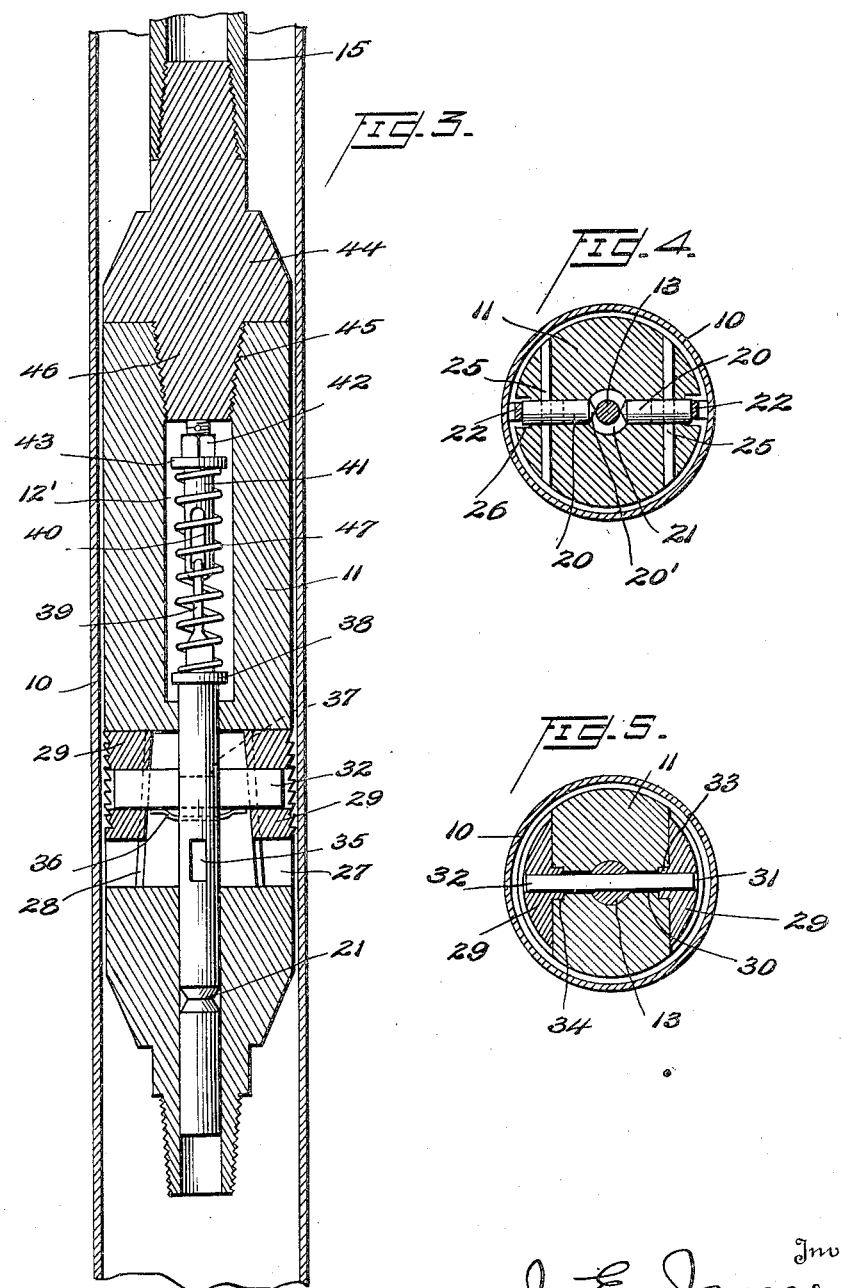

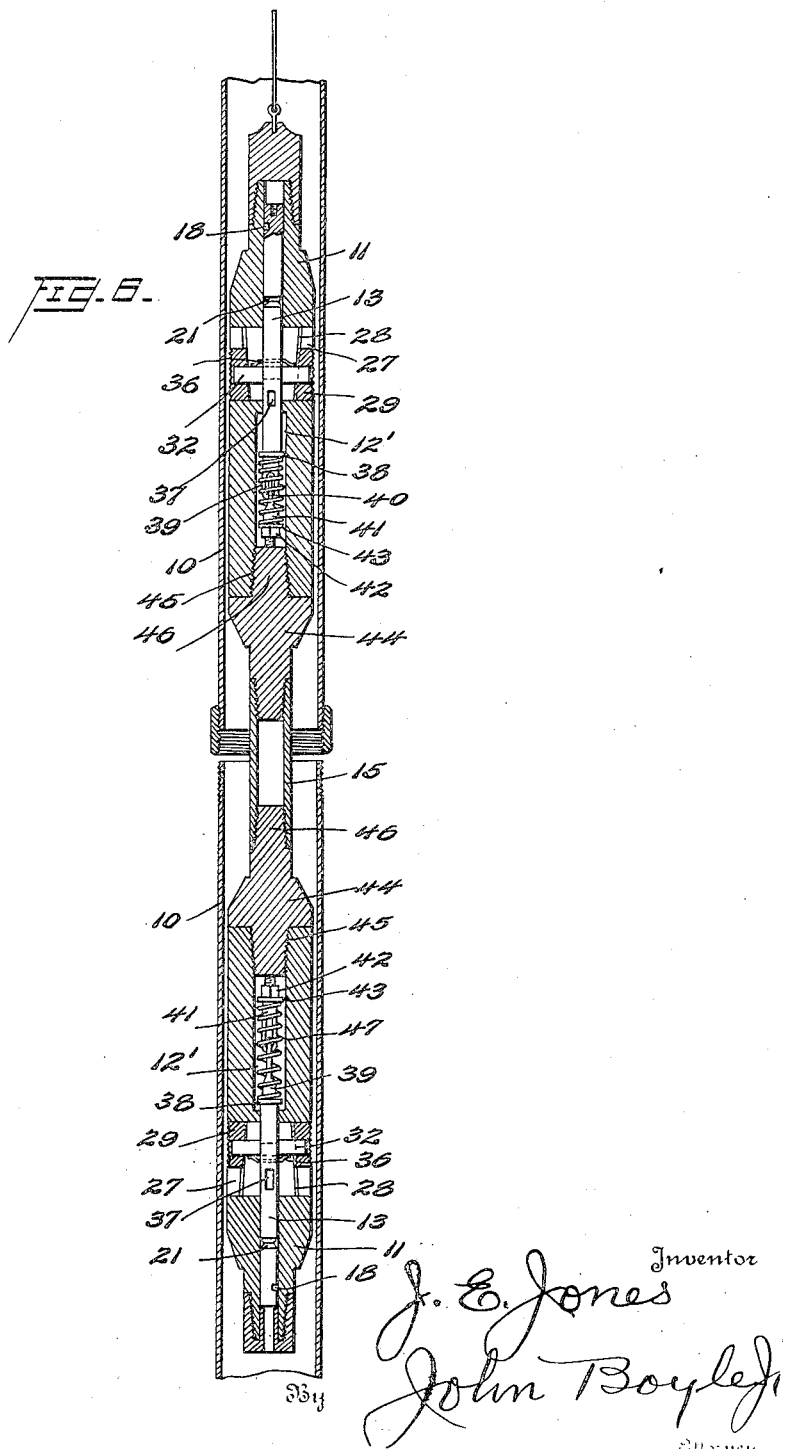

1,507,291

UNITED STATES PATENT OFFICE.

JESSIE E. JONES, OF BARTLESVILLE, OKLAHOMA.

COMBINED CASING SPEAR AND COUPLER.

Application filed August 20, 1921. Serial No. 493,865.

*To all whom it may concern:*

Be it known that I, JESSIE E. JONES, a citizen of the United States, residing at Bartlesville, in the county of Washington and State of Oklahoma, have invented new and useful Improvements in Combined Casing Spears and Couplers, of which the following is a specification.

This invention relates to a combined casing spear and coupler designed for use in coupling sections of casings as well as inserting and withdrawing the same from a well. It has its specific adaptation in an instrument of this type in which a plurality of jaws slide upon inclined planes to grip the inner wall of the casing for the purpose of firmly connecting the spear and casing.

It has for its object the securing of the double function of spear and coupler in a device of this type with a minimum number of parts and with but slight altering of the position of the parts in the adapting of the spear to the function of a coupler. A further object of the invention is the provision of a single set of sliding jaws for accomplishing both of said functions. A further object of the invention is the provision of an instrument of this type which may be reversed in position in use to secure these two functions. A still further object of the invention is the simplification of a double-functioning instrumentality in which the several parts are employed in securing the double function, thereby avoiding multiplication of elements.

Other objects and advantages of the invention will hereinafter appear in the following description and the novel features thereof will be particularly pointed out in the appended claims.

Like reference numerals indicate like parts throughout the several figures of the drawings, in which—

Figure 1 is a vertical sectional view through my combined spear and coupler showing it inserted in a well casing in position for use as a coupler;

Figure 2 is a similar view taken on a vertical plane at right angles to that of Figure 1;

In these two views the parts are shown in their position of inactivity for easy insertion in the casing;

Figure 3 is a similar view with the spear reversed, inserted in a casing with the parts in active position for use as a withdrawing instrumentality;

Figure 4 is a transverse section on the line 4—4 of Figure 1,

Figure 5 is a similar view on the line 5—5 of Figure 2, and

Figure 6 is a sectional view showing the use of two units for coupling pipe sections.

I shall now proceed to a detailed description of a combined spear and coupler, which however should be considered as indicative only of the invention, the real scope of which is defined by the appended claims.

Changes in the details of construction and in the arrangement of parts may be made without departing from the spirit of the invention, as contemplated by the claims.

The numeral 10 designates a section of a well casing while 11 has been chosen to indicate the combined spear and coupler as a whole. The body portion of the spear is of circular form to fit and freely move within the tubular casing 10. It is provided throughout its length with a centrally disposed bore 12 for the reception of the operating plunger 13. The bore 12 is of a size to receive for free and easy reciprocating movement the plunger 13, but at one end it is enlarged to receive the expansion spring and associated parts 14. The body of the spear at its ends is provided with means for attaching it to the end of a fishing rod or tube 15.

Referring particularly to Figures 1 and 2, which are sectional views taken upon planes at right angles through the spear, it will be seen that the upper end of the operating plunger is provided with a screw threaded socket 16 for the attachment of the threaded end of the operating rod 17, the plunger being shown at this point as broken away in Figure 2 for better illustration. Below this connection there is a recess 18, in which a tool of any form may be inserted to hold the plunger in an elevated position against the pressure of the spring while changing the position of the parts, as will hereinafter appear.

In the spear body are formed transverse slots 19 communicating with the plunger bore 12 in which are mounted sliding bolts 20 having pointed ends 20', which are designed to take into a V groove 21 formed in the plunger 13; as shown in Figure 1. The bolts will engage and hold the plunger in the position shown under the influence of leaf springs 22 which bear at one end upon the exposed ends of the bolts and at their opposite ends are secured to the body of the spear by means of the screws 23, slots 24 being formed in the springs at this point to accomplish the proper positioning thereof with relation to the bolts. In order to accomplish the proper limiting of the movement of the bolts 20 within the slots 19, the slot and pin connection 25 between the parts is provided, as will be readily understood. It will appear that the body of the spear is cut away or recessed at opposite sides sufficiently to provide a chamber 26 for the reception of the springs 22, which are not intended to project outwardly beyond the circular contour of the spear body.

On opposite sides of the spear body there are provided recesses or chambers 27 having rear walls inclined from the vertical in order to provide inclined planes for the rear slanting faces of a pair of gripping jaws 29. It will be appreciated that in the position shown in Figure 2, these jaws are within the circular contour of the spear body, but when raised relatively to the spear body, they will project beyond said contour and engage the encircling wall of the casing within which the spear has been placed.

In order that the jaws may be moved within the chambers 27 provided for them in the spear body, there are provided (see Figure 5) transverse slots 30 in the spear body and plunger and communicating slots 31 in the jaws 29, into which is placed a key 32, and in order that the jaws may be the more effectively guided they are provided upon their rear faces with vertical ribs 33, which lie and move in vertical grooves in the spear body.

The key is connected to the plunger and moves therewith, the particular connection being designed to hold the key centrally upon the plunger, and comprises a notch 35 in the lower face of the key, whose length is slightly greater than the diameter of the plunger, so that when it is placed in the slot in the plunger, the key will fall and be retained under the influence of the leaf spring 36.

The outer faces of the jaws 29 are toothed in order to secure the maximum of gripping effect. Below the key slot 30 in the plunger 13, there is a second key slot 37 into which the key 32 is adapted to be inserted in the second use of the spear, as will hereinafter appear. At the lower end there is a collar 38 and the plunger terminates in a link 39. Fitting the link 39 is a second link 40 in a manner best described as a loose chain-link connection. The link 40 is formed integral with a stub plunger 41 screw threaded at its lower end for the reception of a nut 42 and supported above said nut is a loose collar 43. About the loose fitting chain-link connection formed by the links 39 and 40 there is a coiled spring 47 acting to spread apart the collars 38 and 43. The lower end of the spear body has means for attachment of the head 44, which comprises a threaded conical mouth 45 in the spear body and a correspondingly shaped threaded projection 46 upon the head 44. In the position of the parts shown in Figures 1 and 2, it will be appreciated that the pressure of the spring 47 tends to raise the plunger 13 within the body of the spear and thereby lift the jaws 29.

Before describing the operation of the device, the method of assembling the parts will be outlined. The plunger 13 with its stub plunger and spring is inserted in the bore 12 from the bottom so that the spring and associated parts will occupy the chamber 12'. The rod 17 is screwed into the upper end of the plunger for the purpose of manipulating the same. In this position of the parts the plunger is freely movable in the bore 12 and not as yet under the influence of the spring 47. The bolts 20 are now inserted in the slots 19 and pinned therein. The plunger is placed in such position within the bore 12 so that the pointed ends of the bolts will take into the groove 21 when the springs 22 are attached to the body and bear at their upper ends upon the ends of the bolts. It will be understood that the pressure of these springs is sufficient to hold the plunger in this position, even against the normal pressure of the spring 47.

The jaws 29 are now placed in the chambers 27 provided for their reception and the key 32 is inserted through said jaws and through the plunger where it will be securely held by the provision of the notch 35 and leaf spring 36. Finally the head 44 is screwed into the spear body which will place the spring 47 under tension but not sufficient tension to overcome the holding effect of the bolts 20, and especially when the instrument is inserted in a casing and the humps 22' are in close proximity to the casing.

With the parts thus assembled, the instrument is ready to be inserted into a well casing for the purpose of using it as a coupler, the jaws 29 being held within the contour of the spear body and permitting the easy insertion of the spear within the casing. After it is lowered to the proper depth in the well, the rod 17 is pulled up with sufficient force to release the bolts 20 from the groove 21, when the spring 47 will exert force enough to maintain the plunger lifted so that the jaws 29 will come into gripping relation with the casing wall. It will be understood that the leaf springs 22 will hold the bolts 20 in engagement with the groove 21, and particularly when the instrument is in the casing when the humps 22′ are in close proximity to the casing wall. A downward pressure upon the fishing rod or tube 15 will cause the jaws to be the more firmy gripped to the wall of the casing, when a turning movement of the fishing rod or tube will be communicated to the spear body as a whole and to the casing.

The removal of the instrument from the casing is accomplished by the simple lifting of the instrument, as the jaws will yield in the downward direction against the pressure of the spring 47.

If it is now desired to use the instrument as a spear for the withdrawal of a casing section, it is only necessary to reverse the position of the parts, attaching the fishing rod or tube to the head 44, as shown in Figure 3 and to remove the key 32 from the slot 30, placing the same in the slot 37. In such position of the parts the spring 47 has expended itself and will exert but small influence upon the jaws, just sufficient to insure that the jaws will engage the wall of the casing when inserted therein. It may be found desirable in making this change of position of the key to lift the plunger within the bore 12 sufficiently to bring the notch or recess 18 above the upper end of the spear body, when a suitable tool may be inserted in said notch or recess to temporarily hold the parts in this position, against a slight strengthening of the spring 47. At this time, the slots 30 and 37 will be in communication and the key easily inserted.

Upon inserting the instrument within a casing, the jaws will normally slightly engage the wall thereof but not enough to prevent its easy descent to such point in the casing as it is desired to establish a firm engagement for the purpose of withdrawing the same from the well. An upward pull upon the fishing rod or tube 15 will cause the jaws to engage the casing firmly as is usual in this type of casing spear and the section of the casing will be lifted with the spear and removed from the well.

In Figure 6 I have shown the manner of coupling casing sections by the use of two units, one acting as an inactive spear and the other as a coupler, coupled together; in this use perfect registration of the casing sections is produced.

Having described my invention, what I claim as new and desire to secure by Letters Patent is:

1. In a combined casing spear and coupler, an invertible body provided at both ends with means for attaching supporting members, projectile elements provided with inclined teeth, and means within the body for projecting said elements beyond the contour thereof comprising a plunger and a key, said key adapted to occupy different positions with respect to the plunger to vary the force exerted upon said projectile elements.

2. In a combined spear and coupler, a body having a chamber therein, a gripping element in said chamber adapted to project beyond the contour of the body to engage a casing wall, a spring for urging the gripping element against the casing wall, and means for varying the tension of said spring upon said gripping element, whereby the gripping element may be used as a part of a lifting spear or a coupler upon reversal of the position of the body within the casing.

3. In a combined spear and coupler for well casings, the combination with a spear body, of gripping elements within said body adapted to project beyond the contour thereof for engagement with the casing wall, means for maintaining said gripping elements within the contour of the casing, means for releasing said retaining means to place the gripping elements under spring pressure, and means for relieving the tension of the urging spring, whereby the device may be adapted for use as a lifting spear as well as a coupler.

4. In a combined spear and coupler for well casings, a body having a contour corresponding to that of a well casing, a plurality of gripping elements within the body adapted to project beyond the same for engaging the casing wall, means for urging said gripping elements into contact with the casing wall including a spring, means for locking said spring compressed whereby the gripping elements will be held within the contour of said body, means for releasing the lock from said spring, and means for releasing the tension of the spring upon said gripping elements.

5. In a combined spear and coupler for well casings, the combination of a body having a longitudinal bore therein, a plunger movable in said bore and spring pressed in one direction, a plurality of jaws mounted in said body upon inclined planes whereby they may be forced beyond the contour of the body to engage the casing wall, said jaws being connected to said plunger to be urged toward the casing wall in the movement of said plunger, a spring pressed locking device for holding said plunger against the tension of said spring, and means acting upon said plunger for releasing said locking device.

6. In a combined spear and coupler for well casings, the combination with a body having a longitudinal bore therein, of a plunger in a said bore provided with a V-shaped groove, a pair of key-receiving slots and at its lower end with a spring pressed collar, spring pressed locking bolts cooperating with said groove, sliding gripping jaws adapted to be keyed to said plunger in either of two positions, means at both ends of said body for attachment of a fishing rod or tube, and means connected to said plunger for removing the lock therefrom.

7. In a casing spear, a body having a longitudinal bore, one end of which is enlarged, a spring pressure device in said enlarged end acting upon said plunger, a pair of jaws keyed to said plunger and adapted to be forced outwardly beyond the face of the spear in the movement of the plunger, a lock for maintaining said plunger against the tension of said spring device, and a rod connected to said plunger for releasing the lock.

8. In a casing spear and coupler, the combination with a body having a longitudinal bore, of a plunger movable in said bore, a spring for urging said plunger in one direction, and a plurality of jaws adapted to be keyed to said plunger in a plurality of positions, in one of which the full tension of the spring is exerted upon said jaws and in the other of which the tension of the spring is removed from said jaws.

9. In a combined casing spear and coupler, the combination of a body, a longitudinal bore therein, a plunger movable in said bore, sliding jaws controlled by the movement of said plunger, a spring acting upon said plunger, a locking means for said plunger comprising a bolt engaging the plunger, and a leaf spring secured in a vertical groove in the body bearing at one end upon said bolt and with its hump closely abutting the casing wall.

In testimony whereof, I affix my signature.

JESSIE E. JONES.